United States Patent
Araki et al.

(10) Patent No.: US 11,578,209 B2
(45) Date of Patent: Feb. 14, 2023

(54) ROOM TEMPERATURE MOISTURE-CURABLE SILICONE GEL COMPOSITION, AND CURED PRODUCT AND ARTICLE THEREFROM

(71) Applicant: SHIN-ETSU CHEMICAL CO., LTD., Tokyo (JP)

(72) Inventors: Tadashi Araki, Annaka (JP); Sawako Shoda, Annaka (JP); Takahiro Yamaguchi, Annaka (JP); Tomoki Akiba, Annaka (JP)

(73) Assignee: SHTN-ETSU CHEMICAL CO., LTD., Tokyo (JP)

( * ) Notice: Subject to any disclaimer, the term of this patent is extended or adjusted under 35 U.S.C. 154(b) by 286 days.

(21) Appl. No.: 16/772,059

(22) PCT Filed: Nov. 28, 2018

(86) PCT No.: PCT/JP2018/043740
§ 371 (c)(1),
(2) Date: Jun. 11, 2020

(87) PCT Pub. No.: WO2019/116892
PCT Pub. Date: Jun. 20, 2019

(65) Prior Publication Data
US 2020/0392338 A1    Dec. 17, 2020

(30) Foreign Application Priority Data

Dec. 15, 2017    (JP) .............................. JP2017-240427

(51) Int. Cl.
C08L 83/06 (2006.01)
C08K 5/5425 (2006.01)
C08L 83/04 (2006.01)
C08G 77/16 (2006.01)

(52) U.S. Cl.
CPC .......... C08L 83/06 (2013.01); C08K 5/5425 (2013.01); C08L 83/04 (2013.01); C08G 77/16 (2013.01)

(58) Field of Classification Search
CPC ....... C08L 83/04; C08L 83/06; C08K 5/5425; C08G 77/16
See application file for complete search history.

(56) References Cited

U.S. PATENT DOCUMENTS 4,560,784 A * 12/1985 Mori ..................... C08G 77/398
556/401
2016/0207832 A1* 7/2016 Ostendorf ............... C04B 26/32
2017/0037066 A1    2/2017 Yamaguchi et al.
2017/0130031 A1* 5/2017 Yamaguchi ............ C08G 77/38
2018/0201786 A1    7/2018 Araki
2018/0315906 A1    11/2018 Sato et al.

FOREIGN PATENT DOCUMENTS

| JP | 60-163966 A | 8/1985 |
| JP | 63-268765 A | 11/1988 |
| JP | 1-272682 A | 10/1989 |
| JP | 5-163438 A | 6/1993 |
| JP | 2008-291148 A | 12/2008 |
| JP | 5962599 B2 | 8/2016 |
| JP | 2017-25232 A | 2/2017 |
| WO | WO 2015/162962 A1 | 10/2015 |
| WO | WO 2015/194340 A1 | 12/2015 |
| WO | WO-2015194340 A1 * 12/2015 ............. C08G 77/38 |
| WO | WO 2017/081850 A1 | 5/2017 |

OTHER PUBLICATIONS

International Search Report (PCT/ISA/210) issued in PCT/JP2018/043740 dated Mar. 5, 2019.
Written Opinion (PCT/ISA/237) issued in PCT/JP2018/043740 dated Mar. 5, 2019.

* cited by examiner

*Primary Examiner* — James C Goloboy
(74) *Attorney, Agent, or Firm* — Birch, Stewart, Kolasch & Birch, LLP

(57) ABSTRACT

Provided is a room temperature moisture-curable silicone gel composition containing: (A) diorganopolysiloxane, both terminals of which are blocked by silanol groups; (B) hydrolysable organosilicon compound represented by Formula (2) and/or a partial hydrolysate thereof (2)

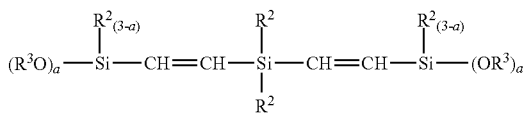

(where $R^2$ is a monovalent hydrocarbon group, $R^3$ is an alkyl group or a cycloalkyl group, and a is 2 or 3.); (C) a curing catalyst; and (D) a heat-resistant aid containing a homogeneous mixture of (D-a), (D-b), and (D-c) (where (D-a) is organopolysiloxane having a viscosity of 10-10,000 mPa·s at 25° C., (D-b) is carboxylate of cerium, and (D-c) is a titanium compound and/or a partial hydrolytic condensate thereof). This room temperature moisture-curable silicone gel composition can be a silicone gel cured product which has a small variation rate of low-stress properties evaluated by the index such as penetration even under heat-resistant conditions exceeding 230° C. and which has excellent heat-resistance.

12 Claims, No Drawings

ROOM TEMPERATURE MOISTURE-CURABLE SILICONE GEL COMPOSITION, AND CURED PRODUCT AND ARTICLE THEREFROM

TECHNICAL FIELD

This invention relates to a room temperature moisture-curable silicone gel composition having excellent heat resistance, a silicone gel cured product obtained by curing the room temperature moisture-curable silicone gel composition, and an article comprising a layer of the silicone gel cured product. As used herein, "room temperature" (RT) is a temperature of 20° C.±15° C.

BACKGROUND ART

Silicone gel compositions are generally prepared as addition reaction-curable organopolysiloxane gel compositions comprising an organohydrogenpolysiloxane having a silicon-bonded hydrogen atom (i.e., SiH group), an organopolysiloxane having a silicon-bonded alkenyl group such as vinyl, and a platinum-based catalyst wherein on heating, hydrosilylation addition reaction of the silicon-bonded hydrogen atom to the alkenyl group yields gel-like cured products. The silicone gel compositions are heat cured into silicone gel cured products, which find use in the protection of electronic parts including automobile electronic parts and consumer electronic parts because of improved heat resistance, weather resistance, oil resistance, freeze resistance, and electrical insulation as well as low elastic modulus and low stress. The low elastic modulus and low stress which are characteristic of the silicone gel cured product are not available from other elastomer products. The recent demand for automobile and consumer electronic parts having higher reliability imposes an increasing need to impart heat resistance to silicone gel materials for encapsulation.

For the silicone gel cured products obtained from addition curing of addition reaction curable organopolysiloxane gel compositions, it is known that as the temperature elevates above 150° C., a creep hardening phenomenon occurs that the silicone gel cured products gradually become harder, detracting from the low elastic modulus or low stress. As the measure for suppressing the creep hardening, in the case of general silicone rubbers, it is known effective to fill the rubbers with such fillers as carbon and iron oxide. For the silicone gel materials requiring a low viscosity and transparency, the means of filling the silicone materials with fillers is not readily acceptable because of many demerits including transparency drop, filler settlement, viscosity buildup, and working inefficiency.

JP-A 2008-291148 (Patent Document 1) describes the use of a cerium metal salt as the means for imparting heat resistance. On use of cerium, however, an outstanding creep hardening phenomenon is observed at temperatures above 230° C. A new means for imparting heat resistance is thus desired.

Recently, JP 5962599 (Patent Document 2) describes the use of iron carboxylate as the means for imparting heat resistance. Either of JP-A 2008-291148 and JP 5962599 requires to premix the salt with organopolysiloxane and heat treat the premix to form a reaction product, prior to addition. Like JP-A 2008-291148, an outstanding creep hardening phenomenon is observed at temperatures above 230° C.

Also, JP-A 2017-025232 (Patent Document 3) describes the use of nickel and niobium carboxylates as the means for imparting heat resistance. Like JP-A 2008-291148 and JP 5962599, an outstanding creep hardening phenomenon is observed at temperatures above 230° C. The technique of further improving heat resistance remains unsolved.

PRIOR ART DOCUMENTS

Patent Documents

Patent Document 1: JP-A 2008-291148
Patent Document 2: JP 5962599
Patent Document 3: JP-A 2017-025232

SUMMARY OF INVENTION

Technical Problem

An object of the invention, which has been made under the above-mentioned circumstances, is to provide a RT moisture-curable silicone gel composition which cures into a silicone gel cured product having heat resistance at high temperatures, i.e., a minimal variation of low-stress (evaluated by such an index as penetration) even under heat resisting conditions, a silicone gel cured product obtained by curing the silicone gel composition, and an article comprising a layer of the silicone gel cured product.

As used herein, the "silicone gel cured product" refers to a cured product which is mainly composed of an organopolysiloxane, has a very low crosslinking density, and exhibits a penetration of 10 to 200, especially 10 to 150 according to JIS K2220 (¼ cone). The cured product is equivalent to one having a rubber hardness of 0 by rubber hardness measurement according to JIS K6253 and hence, a hardness as low as not to exhibit an effective rubber hardness (i.e., is soft). In this respect, the silicone gel cured product is distinguished from typical silicone rubber cured products (i.e., rubber-like elastomers).

Solution to Problem

Making extensive investigations to attain the above object, the inventors attempted to solve the outstanding problems by using a moisture-curable silicone gel composition (which cures with airborne moisture) rather than conventional addition reaction curable silicone gel compositions. Eventually, the inventors have found that a RT moisture-curable silicone gel composition prepared to the formulation shown below cures into a silicone gel cured product having excellent heat resistance and a minimal variation of low-stress (evaluated by such an index as penetration) even under heat resisting conditions in excess of 230° C., especially after 1,000 hours at 250° C.

Accordingly, the invention provides a RT moisture-curable silicone gel composition, a silicone gel cured product obtained by curing the RT moisture-curable silicone gel composition, and an article comprising a layer of the silicone gel cured product, as defined below.

1. A room temperature moisture-curable silicone gel composition comprising the following components (A), (B), (C), and (D):

(A) an organopolysiloxane having the general formula (1):

$$HO(SiR^1_2O)_nH \qquad (1)$$

wherein $R^1$ which may be identical or different is a substituted or unsubstituted $C_1$-$C_{10}$ monovalent hydrocarbon group, and n is an integer of at least 10, (B) a hydrolyzable organosilicon compound having the general formula (2) and/or a partial hydrolyzate thereof:

[Chem. 1]

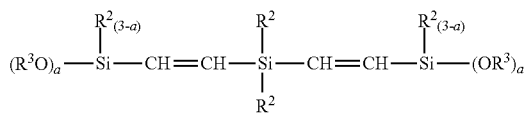
(2)

wherein $R^2$ which may be identical or different is a substituted or unsubstituted $C_1$-$C_{20}$ monovalent hydrocarbon group, $R^3$ is each independently a substituted or unsubstituted $C_1$-$C_{20}$ alkyl group or a substituted or unsubstituted $C_3$-$C_{20}$ cycloalkyl group, and a is 2 or 3, in an amount of 0.01 to 30 parts by weight per 100 parts by weight of component (A), (C) a curing catalyst in an amount of 0.001 to 10 parts by weight per 100 parts by weight of component (A), and (D) a heat resistance enhancer containing a homogeneous mixture of (D-a), (D-b), and (D-c) in an amount of 0.1 to 12 parts by weight per 100 parts by weight of component (A), (D-a) an organopolysiloxane having a viscosity of 10 to 10,000 mPa·s at 25° C., (D-b) a cerium carboxylate having the general formula (3):

    (3)

wherein $R^4$ which may be identical or different is a monovalent hydrocarbon group, $M^1$ is cerium or a rare earth element mixture based on cerium, and f is 3 or 4, in an amount to provide 0.05 to 5 parts by weight of cerium per 100 parts by weight of component (D-a), and (D-c) a titanium compound having the general formula (4) and/or a partial hydrolytic condensate thereof:

    (4)

wherein $R^5$ which may be identical or different is a monovalent hydrocarbon group, in such an amount that the weight of titanium is 0.01 to 5 times the weight of cerium in component (D-b).

2.
The silicone gel composition of 1 wherein component (C) is a difunctional fatty acid tin compound based catalyst and/or an amine based catalyst.

3.
The silicone gel composition of 1 wherein component (C) is a bicyclic guanidine type organic base.

4.
The silicone gel composition of any one of 1 to 3, further comprising (E) an organopolysiloxane having the general formula (5):

[Chem. 2]

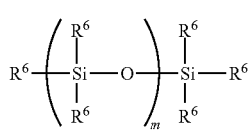
(5)

wherein $R^6$ which may be identical or different is a substituted or unsubstituted $C_1$-$C_{10}$ monovalent hydrocarbon group, and m is an integer of at least 10, in an amount of 0.1 to 300 parts by weight per 100 parts by weight of component (A).

5.
The silicone gel composition of any one of 1 to 4, further comprising (F) a filler in an amount of 0.1 to 10 parts by weight per 100 parts by weight of component (A).

6.
The silicone gel composition of any one of 1 to 5, further comprising (G) an adhesion promoter in an amount of 0.1 to 30 parts by weight per 100 parts by weight of component (A).

7.
A silicone gel cured product obtained by curing the room temperature moisture-curable silicone gel composition of any one of 1 to 6, having a penetration of 10 to 150 according to JIS K2220.

8. An article comprising a layer of the silicone gel cured product of 7.

Advantageous Effects of Invention

The RT moisture-curable silicone gel composition of the invention yields a silicone gel cured product having better heat resistance at high temperature, especially above 230° C., than any prior art compositions.

DESCRIPTION OF EMBODIMENTS

The RT moisture-curable silicone gel composition of the invention is defined as comprising the following components (A) to (D) as essential components. The components are described below in detail. It is noted throughout the specification that the viscosity is measured at 25° C.

Component (A)

Component (A) is an organopolysiloxane having the general formula (1).

    (1)

In formula (1), $R^1$ is a substituted or unsubstituted $C_1$-$C_{10}$ monovalent hydrocarbon group. Examples include alkyl groups such as methyl, ethyl, propyl, butyl, hexyl, and octyl; cycloalkyl groups such as cyclohexyl; alkenyl groups such as vinyl, allyl, propenyl, butenyl and hexenyl; aryl groups such as phenyl and tolyl; aralkyl groups such as benzyl and phenylethyl; and substituted forms of the foregoing in which some hydrogen is substituted by halogen, e.g., chlorine, fluorine or bromine, such as trifluoropropyl. Inter alia, methyl and phenyl are preferred, with methyl being most preferred. Groups $R^1$ may be identical or different.

In formula (1), n indicative of the number of repeating diorganosiloxane units of which the backbone is composed (or degree of polymerization) is an integer of at least 10, preferably such an integer that the organopolysiloxane may have a viscosity at 25° C. in the range of 100 to 10,000 mPa·s, especially 300 to 5,000 mPa·s. Typically, n is an integer of about 10 to 1,000, preferably about 50 to 700, more preferably about 100 to 500.

As used herein, the viscosity is measured by a rotational viscometer, for example, BL, BH, BS or cone-plate type viscometer or rheometer (the same applies hereinafter).

It is also noted that the degree of polymerization or molecular weight may be determined, for example, as a number average degree of polymerization or number average molecular weight by gel permeation chromatography (GPC) versus polystyrene standards using toluene as developing solvent (the same applies hereinafter).

Component (B)

Component (B) is a hydrolyzable organosilicon compound having two alkoxysilyl-vinylene groups (or alkoxysilyl-ethenylene groups) on a common silicon atom, as represented by the general formula (2), i.e., bis(alkoxysilyl-ethenylene)-substituted organosilane compound and/or a partial hydrolyzate thereof. It functions as a curing or crosslinking agent in the inventive RT moisture-curable silicone gel composition, and contributes to the fast-curing ability of the composition. The resulting silicone gel cured product has excellent heat resistance.

[Chem. 3]

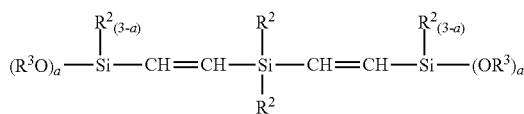

(2)

In formula (2), $R^2$ which may be identical or different is a substituted or unsubstituted $C_1$-$C_{20}$ monovalent hydrocarbon group. $R^3$ is each independently a substituted or unsubstituted $C_1$-$C_{20}$ alkyl group or a substituted or unsubstituted $C_3$-$C_{20}$ cycloalkyl group, and "a" is 2 or 3.

In formula (2), the substituted or unsubstituted monovalent hydrocarbon groups represented by $R^2$ are of 1 to 20 carbon atoms, preferably 1 to 10 carbon atoms, more preferably 1 to 8 carbon atoms, and may be identical or different. Examples include alkyl groups such as methyl, ethyl, n-propyl, isopropyl, n-butyl, isobutyl, tert-butyl, pentyl, neopentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl; cycloalkyl groups such as cyclopentyl and cyclohexyl; alkenyl groups such as vinyl, allyl, propenyl, isopropenyl, butenyl, pentenyl, and hexenyl; aryl groups such as phenyl, tolyl, xylyl, α-, β-naphthyl; aralkyl groups such as benzyl, 2-phenylethyl and 3-phenylpropyl; and substituted forms of the foregoing in which some or all hydrogen atoms are substituted by halogen, e.g., fluorine, chlorine or bromine, or cyano, such as 3-chloropropyl, 3,3,3-trifluoropropyl and 2-cyanoethyl. Inter alia, methyl, ethyl and phenyl are preferred, and methyl and phenyl are most preferred in view of availability, productivity, and cost.

The unsubstituted alkyl groups represented by $R^3$ are of 1 to 20 carbon atoms, preferably 1 to 6 carbon atoms, more preferably 1 to 4 carbon atoms, and examples thereof include methyl, ethyl, n-propyl, isopropyl, n-butyl, isobutyl, tert-butyl, pentyl, neopentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl. The unsubstituted cycloalkyl groups are of 3 to 20 carbon atoms, preferably 4 to 8 carbon atoms, more preferably 5 to 6 carbon atoms, and examples thereof include cyclopentyl and cyclohexyl. In the unsubstituted alkyl and cycloalkyl groups, some or all hydrogen atoms may be substituted by halogen, e.g., fluorine, chlorine or bromine, or cyano, and examples include halo-substituted alkyl groups such as 3-chloropropyl and 3,3,3-trifluoropropyl, and 2-cyanoethyl.

In view of hydrolysis or the like, $R^3$ is preferably methyl or ethyl, most preferably methyl.

The hydrolyzable organosilicon compound having formula (2) as component (B) serves as a curing or crosslinking agent. In formula (2), "a" is 2 or 3 independently on each silicon atom. In case of a=1, linear crosslinking takes place, with no likelihood of forming silicone gel. When "a" is 2 or 3, three-dimensional crosslinking takes place, with a likelihood of forming a silicone gel cured product.

It is now described how to synthesize component (B).

Preparation of Hydrolyzable Organosilicon Compound Having Two Alkoxysilyl-Vinylene Groups on a Common Silicon Atom The hydrolyzable organosilicon compound having two alkoxysilyl-vinylene groups (or alkoxysilyl-ethenylene groups) on a common silicon atom as component (B) may be readily prepared, for example, by addition reaction or hydrosilylation reaction of a silane having two ethynyl groups on a common silicon atom with two molecules of an alkoxyhydrosilane. This reaction is illustrated, for example, by the following reaction scheme [1].

[Chem. 4]

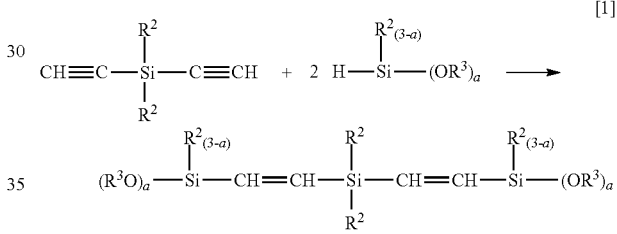

[1]

Herein $R^2$, $R^3$ and a are as defined above.

An addition reaction catalyst is used in adding the alkoxyhydrosilane, examples of which include platinum group metal based catalysts, for example, platinum, palladium, rhodium, and ruthenium based catalysts, with the platinum based catalysts being preferred. Suitable platinum based catalysts include platinum black, solid platinum on carriers such as alumina and silica, chloroplatinic acid, alcohol-modified chloroplatinic acid, complexes of chloroplatinic acid with olefins, and complexes of platinum with vinylsiloxanes. The amount of platinum used is a so-called catalytic amount, for example, an amount to provide 0.1 to 1,000 ppm, especially 0.5 to 100 ppm of platinum group metal based on the total weight of silanes, i.e., the total weight of the silane having two ethynyl groups on a common silicon atom and the alkoxyhydrosilane.

The addition reaction is typically carried out at a temperature of 50 to 120° C., desirably 60 to 100° C. for 0.5 to 12 hours, desirably 1 to 6 hours. While a solventless system allows the reaction to run, a suitable solvent such as toluene or xylene may be used, if necessary, insofar as the addition reaction is not adversely affected.

The addition reaction of the alkoxyhydrosilane to ethynyl groups yields geometric isomers as shown by the following reaction scheme [2], for example. Although E isomer (trans isomer) is created at a high selectivity and high reactivity, Z isomer (cis isomer) may be used as such without a need for separation because it has no adverse impact on the properties of the organosilicon compound as component (B).

[Chem. 5]
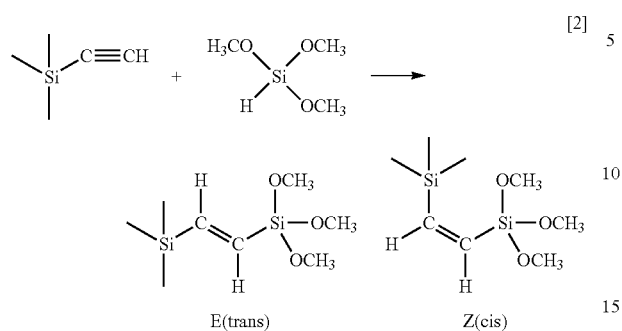
Examples of the hydrolyzable organosilicon compound having two alkoxysilyl-vinylene groups on a common silicon atom, represented by formula (2), include those of the following structural formulae. Component (B) may be used alone or in admixture of two or more.
[Chem. 6]
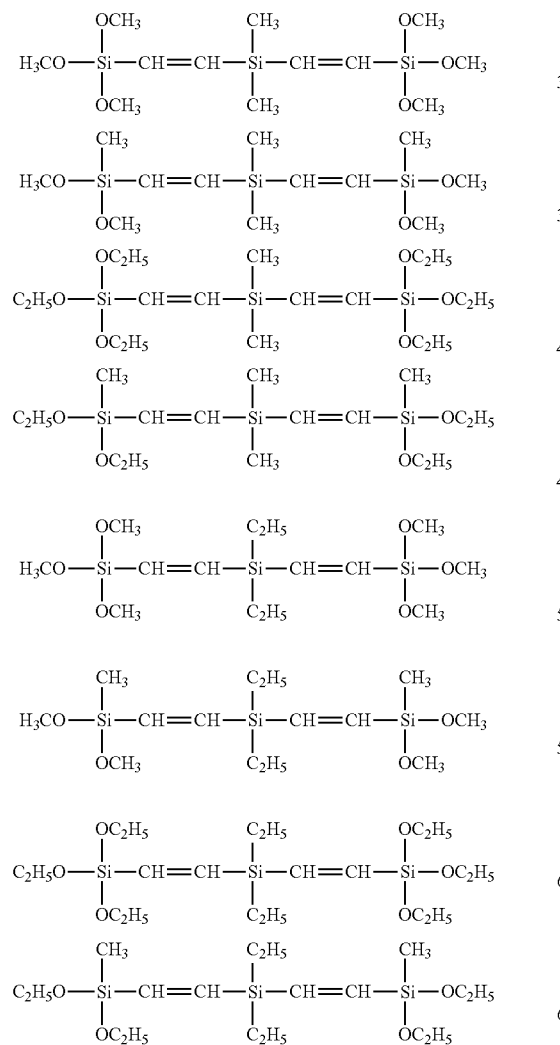
[Chem. 7]
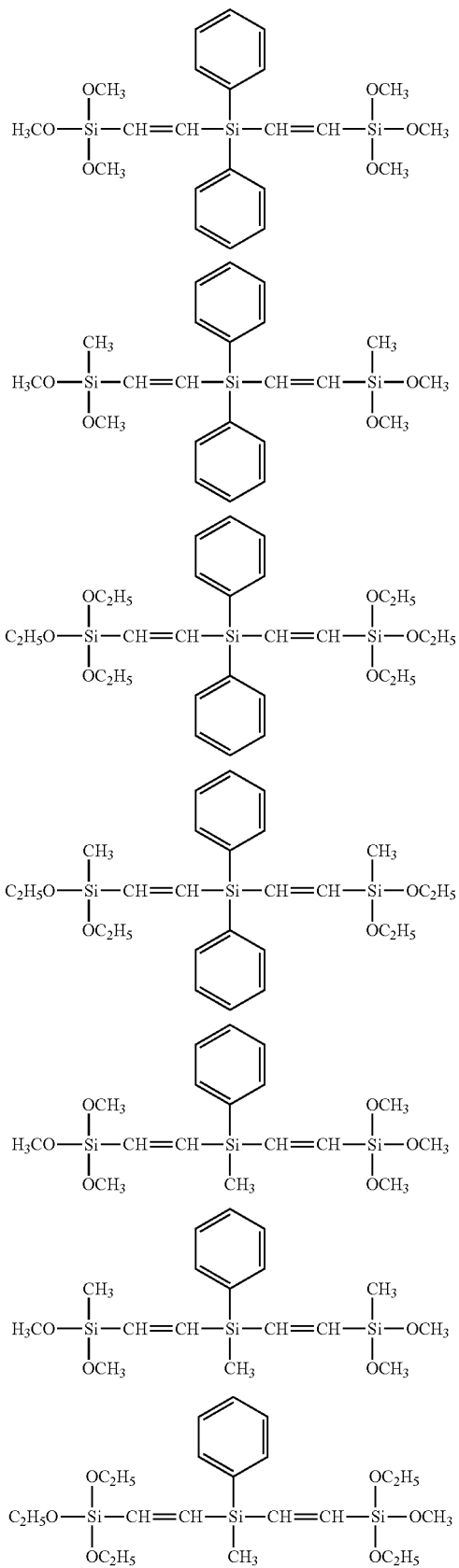

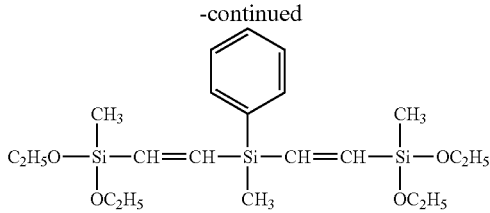

The hydrolyzable organosilicon compound as component (B) is used in an amount of 0.01 to 30 parts by weight, preferably 0.05 to 20 parts by weight, more preferably 0.1 to 10 parts by weight, per 100 parts by weight of the organopolysiloxane as component (A). A composition containing less than 0.01 part by weight of component (B) is insufficiently crosslinkable and is not desirably fast curable. A composition containing more than 30 parts by weight of component (B) gives a cured product having a high hardness in the silicone rubber region and poor mechanical properties and is economically disadvantageous.

Component (C)

Component (C) is a curing catalyst, which is used to promote (hydrolytic) condensation reaction of component (A) with component (B) and hydrolytic condensation reaction of the inventive RT moisture-curable silicone gel composition with airborne moisture, and thus generally referred to as curing catalyst. Use may be made of curing catalysts commonly used in well-known RT-curable silicone rubber compositions which cure in the presence of airborne moisture.

Illustrative examples of the curing catalyst as component (C) include, but are not limited to, alkyltin ester compounds such as dibutyltin diacetate, dibutyltin dilaurate and dibutyltin dioctoate; halogenated tin(II) compounds such as tin(II) chloride, tin(II) bromide and tin(II) iodide; dialkyl tin(II) compounds such as dimethoxytin and diethoxytin; tin(II) fatty acid compounds such as tin laurate and tin octate; titanates and titanium chelate compounds such as tetraisopropoxytitanium, tetra-n-butoxytitanium, tetrakis(2-ethylhexoxy)titanium, dipropoxybis(acetylacetonato)titanium, titanium isopropoxyoctylene glycol; zinc naphthenate, zinc stearate, zinc 2-ethyloctoate, iron 2-ethylhexoate, cobalt 2-ethylhexoate, manganese 2-ethylhexoate, cobalt naphthenate, aluminum alcolate compounds such as aluminum isopropylate and aluminum sec-butyrate; aluminum chelate compounds such as aluminum alkylacetate-diisopropylate and aluminum bisethylacetoacetate-monoacetyl acetonate; organometallic compounds such as bismuth(III) neodecanoate, bismuth(III) 2-ethylhexanoate, bismuth(III) citrate, and bismuth octylate; phosphazene-containing compounds such as N,N,N',N',N'',N''-hexamethyl-N'''-(trimethylsilylmethyl) phosphorimidic triamide; aminoalkyl-substituted alkoxysilanes such as 3-aminopropyltriethoxysilane and N-β-(aminoethyl)-γ-aminopropyltrimethoxysilane; amine compounds or salts thereof such as hexylamine and dodecylamine phosphate; quaternary ammonium salts such as benzyltriethylammonium acetate; alkali metal salts of lower fatty acids such as potassium acetate, sodium acetate and lithium oxalate; dialkylhydroxylamines such as dimethylhydroxylamine and diethylhydroxylamine; guanidyl-containing silanes and siloxanes such as tetramethylguanidyl propyltrimethoxysilane, tetramethylguanidyl propylmethyldimethoxysilane, and tetramethylguanidyl propyltris(trimethylsiloxy)silane; and bicyclic guanidine type organic bases such as 7-methyl-1,5,7-triazabicyclo[4.4.0]dec-5-ene and 1,5,7-triazabicyclo[4.4.0]dec-5-ene.

Of the above-illustrated curing catalysts, the tin(II) fatty acid compounds and amine based catalysts are preferred. Inter alia, the bicyclic guanidine type organic bases which are liquid at 20° C. are more preferred, with 7-methyl-1,5,7-triazabicyclo[4.4.0]dec-5-ene being most preferred.

Component (C) may be used alone or in admixture.

Component (C) is blended in an amount of 0.001 to 10 parts by weight, preferably 0.005 to 5 parts by weight, more preferably 0.01 to 1 part by weight, per 100 parts by weight of the organopolysiloxane as component (A). With less than 0.001 part by weight of component (C), no satisfactory cure is available, with the trouble of retarded curing rate. Inversely, if component (C) exceeds 10 parts by weight, the composition cures too fast, the permissible range of working life of the composition after application is reduced, the resulting silicone gel cured product has low mechanical properties, or the curing catalyst itself bleeds out.

Component (D)

Component (D) is a heat resistance enhancer containing a homogeneous mixture obtained by heat treating the following components (D-a), (D-b), and (D-c) at an elevated temperature, preferably at least 150° C.

Component (D-a) is an organopolysiloxane. It may be any of well-known organopolysiloxanes having a viscosity of 10 to 10,000 mPa·s at 25° C., preferably a linear or branched organopolysiloxane which is substantially based on repeating diorganopolysiloxane units (linear structure) and remains liquid at RT.

The silicon-bonded organic groups (i.e., substituted or unsubstituted monovalent hydrocarbon groups) are as exemplified above for $R^1$ in formula (1) representative of component (A). Specifically, examples include alkyl groups such as methyl, ethyl, propyl, butyl, hexyl and octyl; cycloalkyl groups such as cyclohexyl; alkenyl groups such as vinyl, allyl, propenyl, butenyl, hexenyl; aryl groups such as phenyl and tolyl; aralkyl groups such as benzyl and phenylethyl; and substituted forms of the foregoing in which some hydrogen is substituted by halogen, e.g., chlorine, fluorine or bromine, such as trifluoropropyl. Inter alia, methyl and phenyl are preferred, with methyl being most preferred.

Examples of the organopolysiloxane include those which are blocked at ends of the molecular chain with triorganosiloxy groups, for example, trialkylsiloxy groups such as trimethylsiloxy, alkenyldialkylsiloxy groups such as vinyldimethylsiloxy, dialkenylalkylsiloxy groups such as divinylmethylsiloxy, trialkenylsiloxy groups such as trivinylsiloxy; or hydroxyl groups, alkoxy groups or the like.

Also, a mixture of such organopolysiloxanes is acceptable.

Also, component (D-a) has a viscosity at 25° C. of 10 to 10,000 mPa·s, preferably 50 to 1,000 mPa·s. A viscosity of less than 10 mPa·s may allow a more amount of siloxane to evaporate at high temperature, inviting a large change of weight and a drop of heat resistance. A viscosity in excess of 10,000 mPa·s interferes with smooth admixing with the cerium carboxylate, to be described below, failing to gain satisfactory heat resistance.

Component (D-b) is a cerium carboxylate having the general formula (3):

$$(R^4COO)_fM^1 \qquad (3)$$

wherein R⁴ which may be identical or different is a monovalent hydrocarbon group, M¹ is cerium or a rare earth element mixture based on cerium, and f is 3 or 4.

In formula (3), the monovalent hydrocarbon groups represented by R⁴ are preferably of 1 to 20 carbon atoms, more preferably 1 to 10 carbon atoms, and may be identical or different. Examples include alkyl groups such as methyl, ethyl, n-propyl, isopropyl, n-butyl, isobutyl, sec-butyl, tert-butyl, pentyl, hexyl, cyclohexyl, octyl, 2-ethylhexyl, nonyl, decyl, undecyl, dodecyl, heptadecyl, and octadecyl; alkenyl groups such as vinyl, allyl, and propenyl; aryl groups such as phenyl, tolyl, xylyl, naphthyl and naphthalene; aralkyl groups such as benzyl, phenylethyl and phenylpropyl; and substituted forms of the foregoing in which some or all hydrogen atoms are substituted by halogen, e.g., chlorine, fluorine or bromine, such as chloromethyl and 3,3,3-trifluoropropyl. Inter alia, $C_3$-$C_8$ straight or branched alkyl groups such as isopropyl, hexyl, octyl and 2-ethylhexyl are preferred.

M¹ is cerium or a rare earth element mixture based on cerium. Typical rare earth element mixtures based on cerium include mixtures of at least 51% by weight, preferably at least 70% by weight, more preferably at least 80% by weight of cerium and up to 49% by weight, preferably up to 30% by weight, more preferably up to 20% by weight of rare earth elements other than cerium, e.g., iron, nickel and niobium (totaling to 100% by weight).

Examples of the cerium carboxylate having formula (3), also referred to as cerium salt of carboxylic acid, include cerium salts of saturated aliphatic carboxylic acids such as octanoic acid, 2-ethylhexanoic acid, lauric acid and stearic acid, cerium salts of unsaturated aliphatic carboxylic acids such as oleic acid, cerium salts of cycloparaffinic saturated carboxylic acids such as naphthenic acid, as well as salts of a rare earth element mixture based on cerium with these carboxylic acids.

It is noted that the cerium carboxylate is preferably used as a solution in an organic solvent in view of ease of handling and compatibility with the titanium compound as component (D-c). Exemplary organic solvents include standard solvent, petroleum based solvents such as mineral spirits, ligroin, and petroleum ether, and aromatic solvents such as toluene and xylene.

Component (D-b) is added in an amount to provide 0.05 to 5 parts by weight, preferably 0.1 to 3 parts by weight of cerium per 100 parts by weight of component (D-a). If the amount of cerium is less than 0.05 part by weight, the desired heat resistance is not acquired. If the amount of cerium is more than 5 parts by weight, the distribution of cerium carboxylate in component (D-a) becomes non-uniform, failing to acquire the desired heat resistance.

Component (D-c) is a titanium compound having the general formula (4) and/or a partial hydrolytic condensate thereof:

$$(R^5O)_4Ti \qquad (4)$$

wherein R⁵ which may be identical or different is a monovalent hydrocarbon group.

In formula (4), R⁵ is each independently a monovalent hydrocarbon groups of preferably 1 to 30 carbon atoms, more preferably 1 to 20 carbon atoms. Examples include alkyl groups such as methyl, ethyl, n-propyl, isopropyl, n-butyl, isobutyl, tert-butyl, pentyl, hexyl, cyclohexyl, octyl, 2-ethylhexyl, nonyl, decyl, undecyl, dodecyl, heptadecyl, and octadecyl; alkenyl groups such as vinyl, allyl, and propenyl; aryl groups such as phenyl, tolyl, xylyl, naphthyl and naphthalene; aralkyl groups such as benzyl, phenylethyl and phenylpropyl; and substituted forms of the foregoing in which some or all hydrogen atoms are substituted by halogen, e.g., chlorine, fluorine or bromine, such as chloromethyl and 3,3,3-trifluoropropyl. Inter alia, alkyl groups such as isopropyl, n-butyl, octyl and stearyl are preferred.

Examples of the titanium compound having formula (4) include tetraalkoxy titanium compounds such as tetraisopropyl titanate, tetra-n-butyl titanate, tetraisobutyl titanate, tetra-tert-butyl titanate, tetra-n-hexyl titanate, and tetraisooctyl titanate, as well as partial hydrolytic condensates thereof (i.e., titanium oligomer having at least two, preferably at least three residual hydroxyl or alkoxy groups in the molecule, resulting from partial hydrolytic condensation of alkoxy groups in the tetraalkoxy titanium compound).

Although the titanium compound itself does not contribute to an improvement in heat resistance, component (D-c) functions as an aid for dissolving the cerium carboxylate as component (D-b) in the organopolysiloxane as component (D-a). Component (D-c) is used in such an amount that the weight of titanium is 0.01 to 5 times, preferably 0.05 to 4 times, more preferably 0.1 to 3 times the weight of cerium in component (D-b). With less than 0.01 time of titanium, the uniform incorporation of the cerium carboxylate as component (D-b) in the organopolysiloxane as component (D-a) is difficult. More than 5 times of titanium tends to detract from heat resistance.

The homogeneous mixture as component (D) is obtained by mixing components (D-a), (D-b) and (D-c), and heat treating the mixture at an elevated temperature, preferably at least 150° C. If the heating temperature is lower than 150° C., it is sometimes difficult to obtain a uniform composition. Since the pyrolytic rate of component (D-a) is excessively accelerated at a heating temperature in excess of 310° C., the heat treatment is preferably carried out at 150 to 310° C. The heat treatment may be carried out in the temperature range of more preferably 200 to 305° C., even more preferably 250 to 303° C., for typically 10 minutes to 6 hours, preferably 15 minutes to 4 hours, more preferably 30 minutes to 2 hours.

In the step of mixing components (D-a), (D-b) and (D-c), the three components may be simultaneously mixed. Since the cerium carboxylate as component (D-b) is likely to mass, it is recommended to premix components (D-b) and (D-c) to form a uniform premix and mixing the premix with component (D-a).

Component (D) is added in an amount of 0.1 to 12 parts by weight, preferably 0.2 to 10 parts by weight, more preferably 0.4 to 8 parts by weight, even more preferably 0.5 to 8 parts by weight, most preferably 1 to 7 parts by weight per 100 parts by weight of component (A). Less than 0.1 part by weight of component (D) fails to achieve an effect of improving heat resistance at high temperature. More than 12 parts by weight can invite a substantial drop of insulation or detract from cure.

Component (E)

Component (E) is an optional component. It is an organopolysiloxane having the general formula (5), typically a linear diorganopolysiloxane not containing in the molecule a functional group participating in condensation reaction (not participating in condensation cure reaction of the composition), referred to as non-functional silicone oil.

[Chem. 8]

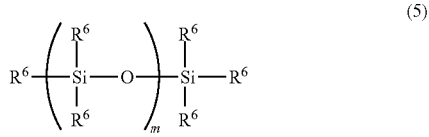

Herein $R^6$ which may be identical or different is a substituted or unsubstituted $C_1$-$C_{10}$ monovalent hydrocarbon group, and m is an integer of at least 10.

In formula (5), the substituted or unsubstituted monovalent hydrocarbon groups represented by $R^6$ are of 1 to 10 carbon atoms, preferably 1 to 8 carbon atoms, more preferably 1 to 6 carbon atoms, and may be identical or different. Examples include alkyl groups such as methyl, ethyl, n-propyl, isopropyl, n-butyl, isobutyl, tert-butyl, pentyl, neopentyl, hexyl, heptyl, octyl, nonyl, and decyl; cycloalkyl groups such as cyclopentyl and cyclohexyl; alkenyl groups such as vinyl, allyl, propenyl, isopropenyl, butenyl, pentenyl and hexenyl; aryl groups such as phenyl, tolyl, xylyl, α- and β-naphthyl; aralkyl groups such as benzyl, 2-phenylethyl and 3-phenylpropyl; and substituted forms of the foregoing in which some or all hydrogen atoms are substituted by halogen, e.g., fluorine, chlorine or bromine, or cyano, such as 3-chloropropyl, 3,3,3-trifluoropropyl and 2-cyanoethyl. Inter alia, methyl and ethyl are preferred, and methyl is most preferred in view of availability, productivity, and cost.

Also, the organopolysiloxane as component (E) should preferably have a viscosity at 25° C. of 10 to 50,000 mPa·s, more preferably 30 to 10,000 mPa·s, even more preferably 50 to 5,000 mPa·s, most preferably 100 to 3,000 mPa·s. If the viscosity of the organopolysiloxane as component (E) is less than 10 mPa·s, the composition may have too low a viscosity and poor workability. If the viscosity exceeds 50,000 mPa·s, the composition may have too high a viscosity and be poorly workable on use.

In formula (5), m is an integer of at least 10. For the same reason as above, m is preferably an integer of about 20 to 1,500, more preferably about 50 to 750.

When component (E) is used, it is blended in an amount of typically 0.1 to 300 parts by weight, preferably 1 to 280 parts by weight, more preferably 10 to 260 parts by weight, even more preferably 30 to 250 parts by weight, most preferably 50 to 240 parts by weight, per 100 parts by weight of component (A). Component (E) need not be added when the RT moisture-curable silicone gel composition cures into a cured product having a low hardness or has a low viscosity enough for satisfactory working. If the amount of component (E) exceeds 300 parts by weight, the RT moisture-curable silicone gel composition becomes less curable, and at the worst, uncurable, or component (E) can bleed out after curing.

Component (F)

Component (F) is an optional component. It is a filler (an inorganic filler and/or organic resin filler) which is used to impart sufficient mechanical strength to the cured product of the inventive RT moisture-curable silicone gel composition. Any well-known fillers may be used, for example, finely divided silica, fumed silica, precipitated silica, such silica treated on surface with organosilicon compounds to be hydrophobic, glass beads, glass balloons, transparent resin beads, silica aerogel, diatomaceous earth, metal oxides such as iron oxide, zinc oxide, titanium oxide, and fumed metal oxides, wet silica which may be surface-treated with silane, reinforcing fillers such as quartz powder, carbon black, talc, zeolite, and bentonite, asbestos, glass fibers, carbon fibers, metal carbonates such as calcium carbonate, magnesium carbonate, and zinc carbonate, asbestos, glass wool, finely divided mica, fused silica powder, powdered synthetic resins such as polystyrene, polyvinyl chloride, and polypropylene. Of these fillers, inorganic fillers such as silica, calcium carbonate, and zeolite are preferred, with fumed silica surface-treated to be hydrophobic and calcium carbonate being especially preferred.

Component (F) is blended in an amount of typically 0 to 10 parts by weight, preferably 0 to 8 parts by weight, more preferably 0 to 5 parts by weight, even more preferably 0 to 3 parts by weight, per 100 parts by weight of component (A). When component (F) is used, it is preferably blended in an amount of at least 0.1 part by weight, more preferably at least 0.3 part by weight. If component (F) is used in an amount in excess of 10 parts by weight, the composition has an increased viscosity, aggravating workability and outer appearance, and can become thixotropic and non-flowing.

Component (G)

Component (G) is an adhesion promoter. It is an optional component and used to impart sufficient adhesion to the cured product of the inventive RT moisture-curable silicone gel composition. As the adhesion promoter, any well-known silane coupling agents such as functional group-containing hydrolyzable silanes may be used. Examples include vinylsilane coupling agents, (meth)acrylsilane coupling agents, epoxysilane coupling agents, aminosilane coupling agents, and mercaptosilane coupling agents. Illustrative examples include vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, γ-aminopropyltriethoxysilane, 3-2-(aminoethylamino)propyltrimethoxysilane, γ-mercaptopropyltrimethoxysilane, and isocyanate silanes.

Inter alia, aminosilanes such as γ-aminopropyltriethoxysilane and 3-2-(aminoethylamino)propyltrimethoxysilane, epoxysilanes such as γ-glycidoxypropyltrimethoxysilane and β-(3,4-epoxycyclohexyl)ethyltrimethoxysilane, and isocyanate silanes are preferred.

Component (G) is blended in an amount of typically 0 to 30 parts by weight, preferably 0.1 to 30 parts by weight, more preferably 0.5 to 20 parts by weight, per 100 parts by weight of component (A). The adhesion promoter need not be added when adhesion is established depending on the type of filler or adherend, in the absence of an adhesion promoter. If the amount of component (G) is too much, the cured product or silicone gel becomes hard, resulting in a loss of flexibility or degradation of heat resistance.

Other Optional Components

Besides the foregoing components (A) to (G), other optional components may be blended in the inventive RT moisture-curable silicone gel composition insofar as the objects of the invention are not compromised. Suitable optional components include, for example, flame retardants, thixotropic agents, pigments, and dyes.

Curing of Composition

The RT moisture-curable silicone gel composition of the invention may be prepared by mixing the essential components (A) to (D) and optional components according to the standard process. At this point, the components may be divided into two or multiple parts, which are mixed together. For example, the components are divided into one part composed of a portion of component (A), components (C) and (D) and another part composed of the remainder of component (A) and component (B), and these two parts are mixed together.

Thereafter, the RT moisture-curable silicone gel composition is cured at RT or an elevated temperature for a particular application, yielding a silicone gel cured product.

The RT moisture-curable silicone gel composition is advantageously used to encapsulate or fill electric/electronic parts. Examples of an article comprising a layer of the silicone gel cured product of the RT moisture-curable silicone gel composition according to the invention include semiconductor devices such as MOSFET (metal oxide semiconductor field effect transistor), IGBT (insulated gate bipolar transistor), and SBD (Schottky barrier diode), and various sensors such as gas pressure sensors, liquid pressure sensors, temperature sensors, humidity sensors, rotation sensors, gravity sensors, timing sensors, and air flow meters.

The cured product of the RT moisture-curable silicone gel composition typically has a penetration of 10 to 200, preferably 10 to 150, more preferably 15 to 100, and even more preferably 20 to 80, as measured according to JIS K2220 using a ¼ cone. If the penetration is less than 10, the electronic circuit may fail to withstand the stress induced upon curing of the silicone gel composition and be broken in part, or the silicone gel may crack inside. If the penetration exceeds 150, a silicone gel having an ability to fully retain its shape may not be obtained or the silicone gel may flow away from the circuit after filling and curing.

EXAMPLES

Synthesis Examples, Examples and Comparative Examples are given below by way of illustration of the invention and not by way of limitation. In Examples, "%" is by weight, and "Vi" stands for vinyl. The viscosity is measured at 25° C. by a rotational viscometer.

The measurement of penetration and the heat resistance test are as follows.

Measurement of Penetration

Each of the cured products of Examples and Comparative Examples was measured for penetration according to JIS K2220 with a ¼ cone, using an automatic penetrometer RPM-101 by Rigo Co., Ltd.

Heat Resistance Test

Each of the cured products of Examples and Comparative Examples was placed in a dryer at 250° C. for 1,000 hours, after which its penetration was measured by the same method as above. A sample is rated "pass" when the percent change of penetration before and after the heat resistance test, i.e., [(penetration after heat resistance test)−(penetration before heat resistance test)]/(penetration before heat resistance test)×100 is within ±50%.

Synthesis of Component (B)

Synthesis Example 1

<Synthesis of Hydrolyzable Organosilicon Compound Having Two Alkoxysilyl-Vinylene Groups on a Common Silicon Atom, i.e., bis(trimethoxysilyl-vinylene)dimethylsilane>

A 500-mL four-necked flask equipped with a mechanical stirrer, thermometer and dropping funnel was charged with 35.0 g (0.323 mol) of diethynyldimethylsilane, 0.10 g of 0.5% toluene solution of chloroplatinic acid ($H_2PtCl_6·6H_2O$), and 50 mL of toluene, to which 83.01 g (0.678 mol) of trimethoxysilane was added dropwise. This was followed by stirring at 85° C. for 6 hours and distillation, obtaining 106.2 g (yield 90%) of the silicon compound, bis(trimethoxysilyl-vinylene)dimethylsilane. The silicon compound was analyzed by $^1$H-NMR spectroscopy, confirming that it was the target compound, bis(trimethoxysilyl-vinylene)dimethylsilane (trans:cis=8:1). This reaction is shown by the following reaction scheme [3].

[Chem. 9]

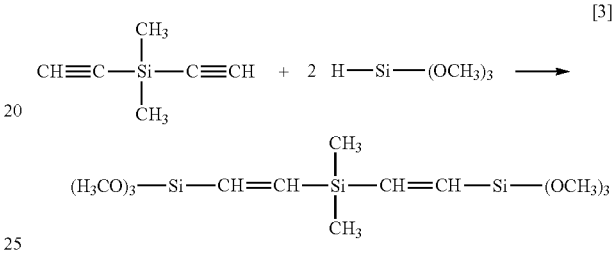

The $^1$H-NMR spectral data of the compound are shown below.

$^1$H-NMR (400 MHz, $C_6D_6$, δ (ppm)): 0.00 (s, 6H), 3.36 (s, 18H), 6.47 (d, 2H), 7.10 (d, 2H)

Synthesis Example 2 <Synthesis of Hydrolyzable Organosilicon Compound Having Two Alkoxysilyl-Vinylene Groups on a Common Silicon Atom, i.e., bis(dimethoxymethylsilyl-vinylene)dimethylsilane>

A 500-mL four-necked flask equipped with a mechanical stirrer, thermometer and dropping funnel was charged with 16.3 g (0.151 mol) of diethynyldimethylsilane, 0.10 g of 0.5% toluene solution of chloroplatinic acid ($H_2PtCl_6·6H_2O$), and 50 mL of toluene, to which 33.4 g (0.315 mol) of dimethoxymethylsilane was added dropwise. This was followed by stirring at 85° C. for 6 hours and distillation, obtaining 42.5 g (yield 88%) of the silicon compound, bis(dimethoxymethylsilyl-vinylene)dimethylsilane. The silicon compound was analyzed by $^1$H-NMR spectroscopy, confirming that it was the target compound, bis(dimethoxymethylsilyl-vinylene)dimethylsilane (trans:cis=9:1). This reaction is shown by the following reaction scheme [4].

[Chem. 10]

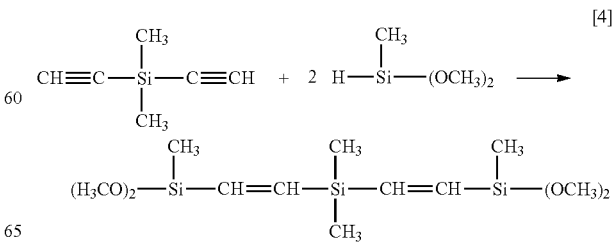

The $^1$H-NMR spectral data of the compound are shown below.
$^1$H-NMR (400 MHz, $C_6D_6$, δ (ppm)): 0.00 (s, 12H), 3.32 (s, 12H), 6.30 (d, 2H), 6.65 (d, 2H)

Synthesis of Component (D)

Synthesis Example 3

<Synthesis of Heat Resistance Enhancer 1>

With thorough stirring, a premix of 10 parts by weight (providing 0.55 part by weight of cerium) of a terpene solution of cerium-based rare earth 2-ethylhexanoate (rare earth content 6%) and 2.1 parts by weight of tetra-n-butyl titanate (the weight of titanium is 0.3 time the weight of cerium in the terpene solution of 2-ethylhexanoate) was added to 100 parts by weight of both end trimethylsiloxy-capped dimethylpolysiloxane having a viscosity of 100 mPa·s. A yellowish white dispersion was obtained. While passing nitrogen gas in a low flow rate, the dispersion was heated at 250° C. to distil off the terpene, and then heated at 300° C. for 1 hour, obtaining a dark reddish brown, substantially transparent heat resistance enhancer 1.

Comparative Synthesis Example 1

<Synthesis of Heat Resistance Enhancer 2>

To 100 parts by weight of both end trimethylsiloxy-capped dimethylsiloxane/diphenylsiloxane copolymer having a viscosity of 700 mPa·s, 2 parts by weight of iron(III) 2-ethylhexanoate solution (iron content 8%) was added. A brown dispersion was obtained. While passing air in a low flow rate, the dispersion was heated at 230° C. for 8 hours, obtaining a dark reddish brown, transparent silicone oil (iron content 1,600 ppm).

Example 1

A composition was prepared by combining 50 parts by weight of dimethylpolysiloxane capped at both ends of the molecular chain with hydroxyl groups (silanol groups) and having a viscosity of 700 mPa·s, 50 parts by weight of dimethylpolysiloxane capped at both ends of the molecular chain with methyl groups and having a viscosity of 1,000 mPa·s, 1.05 parts by weight of bis(dimethoxymethylsilyl-vinylene)dimethylsilane in Synthesis Example 2, 2.0 parts by weight of heat resistance enhancer 1 in Synthesis Example 3, and 0.10 part by weight of 7-methyl-1,5,7-triazabicyclo[4.4.0]dec-5-ene, and mixing them under moisture-blocked conditions until uniform. Thereafter, the composition was transferred to a glass dish where it was cured at 50° C. for about 14 days, obtaining a pale yellow, slightly cloudy cured product having a penetration of 25.

Example 2

A composition was prepared by combining 40 parts by weight of dimethylpolysiloxane capped at both ends of the molecular chain with hydroxyl groups (silanol groups) and having a viscosity of 700 mPa·s, 60 parts by weight of dimethylpolysiloxane capped at both ends of the molecular chain with methyl groups and having a viscosity of 1,000 mPa·s, 0.84 part by weight of bis(dimethoxymethylsilyl-vinylene)dimethylsilane in Synthesis Example 2, 1.0 part by weight of heat resistance enhancer 1 in Synthesis Example 3, and 0.10 part by weight of 7-methyl-1,5,7-triazabicyclo[4.4.0]dec-5-ene, and mixing them under moisture-blocked conditions until uniform. Thereafter, the composition was transferred to a glass dish where it was cured at 50° C. for about 14 days, obtaining a pale yellow, slightly cloudy cured product having a penetration of 50.

Example 3

A composition was prepared by combining 30 parts by weight of dimethylpolysiloxane capped at both ends of the molecular chain with hydroxyl groups (silanol groups) and having a viscosity of 700 mPa·s, 70 parts by weight of dimethylpolysiloxane capped at both ends of the molecular chain with methyl groups and having a viscosity of 1,000 mPa·s, 0.70 part by weight of bis(trimethoxysilyl-vinylene)dimethylsilane in Synthesis Example 1, 2.0 parts by weight of heat resistance enhancer 1 in Synthesis Example 3, and 0.10 part by weight of 7-methyl-1,5,7-triazabicyclo[4.4.0]dec-5-ene, and mixing them under moisture-blocked conditions until uniform. Thereafter, the composition was transferred to a glass dish where it was cured at 50° C. for about 14 days, obtaining a pale yellow, slightly cloudy cured product having a penetration of 30.

Comparative Example 1

A composition was prepared as in Example 1 aside from omitting heat resistance enhancer 1 in Synthesis Example 3. Thereafter, the composition was transferred to a glass dish where it was cured at 50° C. for about 14 days, obtaining a pale yellow, slightly cloudy cured product having a penetration of 25.

Comparative Example 2

A composition was prepared as in Example 1 aside from using 2.0 parts by weight of heat resistance enhancer 2 in Comparative Synthesis Example 1 instead of heat resistance enhancer 1 in Synthesis Example 3. Thereafter, the composition was transferred to a glass dish where it was cured at 50° C. for about 14 days, obtaining a pale yellow, slightly cloudy cured product having a penetration of 25.

Comparative Example 3

A composition was prepared as in Example 1 aside from using 0.1 part by weight of nickel 2-ethylhexanoate (which is commonly used in the prior art as the heat resistance enhancer for silicone gel) instead of heat resistance enhancer 1 in Synthesis Example 3. Thereafter, the composition was transferred to a glass dish where it was cured at 50° C. for about 14 days, obtaining a pale yellow, slightly cloudy cured product having a penetration of 30.

Comparative Example 4

A composition was prepared as in Example 1 aside from using 0.1 part by weight of niobium 2-ethylhexanoate (which is commonly used in the prior art as the heat resistance enhancer for silicone gel) instead of heat resistance enhancer 1 in Synthesis Example 3. Thereafter, the composition was transferred to a glass dish where it was cured at 50° C. for about 14 days, obtaining a pale yellow, slightly cloudy cured product having a penetration of 30.

Comparative Example 5

A composition was prepared by combining 100 parts by weight of both end dimethylvinylsiloxy-capped dimethylpolysiloxane having a viscosity of 1,000 mPa·s, 50 parts by weight of both end dimethylvinylsiloxy-capped dimethylpolysiloxane having a viscosity of 100 mPa·s, 0.2 part by weight of both end trimethylsilyloxy-capped dimethylsiloxane/methylhydrogensiloxane copolymer having a viscosity of 45 mPa·s, represented by the average compositional formula (6):

[Chem. 11]

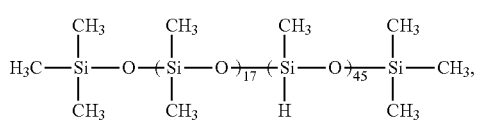

(6)

11.9 parts by weight of both end trimethylsiloxy-capped dimethylsiloxane/methylhydrogensiloxane copolymer having a viscosity of 17 mPa·s, represented by the average compositional formula (7):

[Chem. 12]

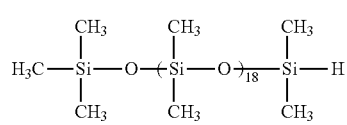

(7)

(wherein the number of silicon-bonded hydrogen atoms per silicon-bonded alkenyl group in the total of both end dimethylvinylsiloxy-capped dimethylpolysiloxanes, referred to as H/Vi, hereinafter, was 0.80), 0.05 part by weight of a dimethylpolysiloxane solution of chloroplatinic acid-vinylsiloxane complex containing 1% of platinum, 0.05 part by weight of ethynylcyclohexanol, and 0.1 part by weight of heat resistance enhancer 1 in Synthesis Example 3 and mixing them until uniform. Thereafter, the composition was transferred to a glass dish where it was heat cured at 120° C. for 60 minutes, obtaining a cured product having a penetration of 40.

Comparative Example 6

A composition was prepared as in Example 1 aside from using 1.0 part by weight of vinyltrimethoxysilane instead of bis(dimethoxymethylsilyl-vinylene)dimethylsilane in Synthesis Example 2. Thereafter, the composition was transferred to a glass dish where it was cured at 50° C. for about 14 days, obtaining a pale yellow, slightly cloudy cured product having a penetration of 23.

Comparative Example 7

A composition was prepared as in Example 1 aside from using 1.0 part by weight of methyltrimethoxysilane instead of bis(dimethoxymethylsilyl-vinylene)dimethylsilane in Synthesis Example 2. Thereafter, the composition was transferred to a glass dish where it was cured at 50° C. for about 14 days, obtaining a pale yellow, slightly cloudy cured product having a penetration of 50.

Table 1 shows the results of the penetration and penetration change of the compositions of Examples 1 to 3 and Comparative Examples 1 to 7 before and after the heat resistance test at 250° C. for 1,000 hours.

TABLE 1

| | Penetration | | |
|---|---|---|---|
| Results | Before heat resistance test: A | After 250° C./1000 h heat resistance test: B | Change (%): C = [(B − A)/A] × 100 |
| Example 1 | 25 | 34 | +36 pass |
| Example 2 | 50 | 72 | +44 pass |
| Example 3 | 30 | 24 | −20 pass |
| Comparative Example 1 | 25 | 1 | −96 fail |
| Comparative Example 2 | 25 | 1 | −96 fail |
| Comparative Example 3 | 30 | 90 | +200 fail |
| Comparative Example 4 | 30 | 100 | +233 fail |
| Comparative Example 5 | 40 | 1 | −98 fail |
| Comparative Example 6 | 23 | 46 | +100 fail |
| Comparative Example 7 | 50 | 10 | −80 fail |

Evaluation

The compositions of Examples 1 to 3 meet the requirements of the invention and the cured products thereof show a change of penetration within ±50% after long-term heating at 250° C. It is proven that the cured product is silicone gel experiencing only a little change of hardness at high temperature.

In contrast, the compositions of Comparative Examples 1 to 4 do not contain the heat resistance enhancer as component (D). Specifically, the cured product of Comparative Example 1 in which the heat resistance enhancer is not added undergoes creep hardening upon heating at 250° C., turning hard as demonstrated by a penetration of 1. Comparative Example 2 attempts to improve by adding the heat resistance enhancer in the form of iron carboxylate-containing silicone dispersion. Since this heat resistance enhancer inhibits the progress of curing reaction, like Comparative Example 1, the cured product undergoes creep hardening upon heating at 250° C., turning hard as demonstrated by a penetration of 1. Comparative Examples 3 and 4 attempt to improve by adding the heat resistance enhancer containing nickel or niobium. Since the siloxane skeleton in the cured products is cracked upon heating at 250° C., the cured products increase their penetration, with the change of penetration deviating from the range of ±50%.

Comparative Example 5 is an addition cure type silicone gel composition having the heat resistance enhancer as component (D) added thereto. The cured product undergoes creep hardening at a high temperature of 250° C., turning hard as demonstrated by a penetration of 1. It is concluded from these results that the addition of component (D) to a condensation cure type silicone gel composition is quite effective.

Further, the compositions of Comparative Examples 6 and 7 do not use a hydrolyzable organosilicon compound having two alkoxysilyl-vinylene groups on a common silicon atom and/or partial hydrolyzate thereof as component (B). Specifically, Comparative Example 6 uses vinyltrimethoxysilane instead of the organosilicon compound as component (B). The penetration after 250° C./1,000 h is within the measurement range, but the change of penetration deviates from the range of ±50%. The cured product is judged to be a silicone gel experiencing a larger change of penetration after the heat resistance test than the inventive compositions. Comparative Example 7 uses methyltrimethoxysilane instead of the organosilicon compound as component (B). Since this composition is incomplete in the initial cured state, the initial penetration is high. As dehydration condensation takes place upon heating at 250° C., the cured product turns hard as demonstrated by a penetration of 10.

The foregoing results attest the effectiveness of the invention.

INDUSTRIAL APPLICABILITY

The silicone gel cured product obtained by curing the RT moisture-curable silicone gel composition of the invention maintains a low modulus and low stress characteristic of silicone gel cured products even after long-term holding in 250° C. atmosphere. Long-term durability improvements are expectable in the protection application for electronic parts such as ICs and hybrid ICs and transportation vehicles such as automobiles and aircraft.

The invention claimed is:

1. A silicone gel cured product obtained by curing a room temperature moisture-curable silicone gel composition, comprising the following components (A), (B), (C), and (D):
   (A) an organopolysiloxane having the general formula (1):

$$HO(SiR^1_2O)_nH \quad (1)$$

wherein $R^1$ which may be identical or different is a substituted or unsubstituted $C_1$-$C_{10}$ monovalent hydrocarbon group, and n is an integer of at least 10,
   (B) a hydrolyzable organosilicon compound having the general formula (2) and/or a partial hydrolyzate thereof:

[Chem. 1]

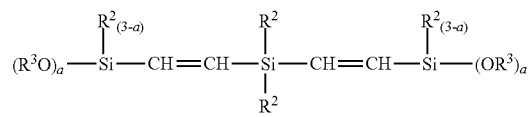

(2)

wherein $R^2$ which may be identical or different is a substituted or unsubstituted $C_1$-$C_{20}$ monovalent hydrocarbon group, $R^3$ is each independently a substituted or unsubstituted $C_1$-$C_{20}$ alkyl group or a substituted or unsubstituted $C_3$-$C_{20}$ cycloalkyl group, and a is 2 or 3, in an amount of 0.01 to 30 parts by weight per 100 parts by weight of component (A),
   (C) a curing catalyst in an amount of 0.001 to 10 parts by weight per 100 parts by weight of component (A), and
   (D) a heat resistance enhancer containing a homogeneous mixture of (D-a), (D-b), and (D-c) in an amount of 0.1 to 12 parts by weight per 100 parts by weight of component (A),
   (D-a) an organopolysiloxane having a viscosity of 10 to 10,000 mPa·s at 25° C.,
   (D-b) a cerium carboxylate having the general formula (3):

$$(R^4COO)_fM^1 \quad (3)$$

wherein $R^4$ which may be identical or different is a monovalent hydrocarbon group, $M^1$ is cerium or a rare earth element mixture based on cerium, and f is 3 or 4, in an amount to provide 0.05 to 5 parts by weight of cerium per 100 parts by weight of component (D-a), and
   (D-c) a titanium compound having the general formula (4) and/or a partial hydrolytic condensate thereof:

$$(R^5O)_4Ti \quad (4)$$

wherein $R^5$ which may be identical or different is a monovalent hydrocarbon group, in such an amount that the weight of titanium is 0.01 to 5 times the weight of cerium in component (D-b),
   said silicone gel cured product being prepared by curing said room temperature moisture-curable silicone gel composition, at room temperature and in the presence of moisture, to form said silicone gel cured product, said silicone gel cured product having a penetration of 10 to 150 as measured according to JIS K2220 using a ¼ cone.

2. An article comprising a layer of the silicone gel cured product of claim 1.

3. The silicone gel cured product of claim 1, wherein in the room temperature moisture-curable silicone gel composition, component (C) is a difunctional fatty acid tin compound based catalyst and/or an amine based catalyst.

4. The silicone gel cured product of claim 1, wherein in the room temperature moisture-curable silicone gel composition, component (C) is a bicyclic guanidine type organic base.

5. The silicone gel cured product of claim 1, wherein the room temperature moisture-curable silicone gel composition further comprising (E) an organopolysiloxane having the general formula (5):

[Chem. 2]

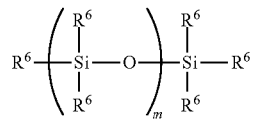

(5)

wherein $R^6$ which may be identical or different is a substituted or unsubstituted $C_1$-$C_{10}$ monovalent hydrocarbon group, and m is an integer of at least 10, in an amount of 0.1 to 300 parts by weight per 100 parts by weight of component (A).

6. The silicone gel cured product of claim 1, wherein the room temperature moisture-curable silicone gel composition further comprising (F) a filler in an amount of 0.1 to 10 parts by weight per 100 parts by weight of component (A).

7. The silicone gel cured product of claim 1, wherein the room temperature moisture-curable silicone gel composition further comprising (G) an adhesion promoter in an amount of 0.1 to 30 parts by weight per 100 parts by weight of component (A).

8. An article comprising a layer of the silicone gel cured product of claim 3.

9. An article comprising a layer of the silicone gel cured product of claim 4.

10. An article comprising a layer of the silicone gel cured product of claim 5.

11. An article comprising a layer of the silicone gel cured product of claim 6.

12. An article comprising a layer of the silicone gel cured product of claim 7.

* * * * *